(12) United States Patent
Karasawa et al.

(10) Patent No.: US 6,440,182 B1
(45) Date of Patent: Aug. 27, 2002

(54) METHOD FOR BONDING COLLECTOR PLATES TO END FACES OF ELECTRODE PLATES

(75) Inventors: Shoji Karasawa, Kosai; Hiromi Kajiya, Toyohashi; Yoshihiro Tokutome, Toyota; Masaru Masaki, Nisshin; Shinichi Hibino; You Noguchi, both of Tokyo, all of (JP)

(73) Assignees: Matsushita Electric Industrial Co., Ltd., Osaka; Toyota Jidosha Kabushiki Kaisha, Aichi; Mitsubishi Denki Kabushiki Kaisha, Tokyo, all of (JP)

( * ) Notice: Subject to any disclaimer, the term of this patent is extended or adjusted under 35 U.S.C. 154(b) by 162 days.

(21) Appl. No.: 09/670,526

(22) Filed: Sep. 26, 2000

(30) Foreign Application Priority Data

Sep. 28, 1999 (JP) .......................... 11-274302

(51) Int. Cl.⁷ ................................. H01M 2/26
(52) U.S. Cl. ....................... 29/623.1; 429/161
(58) Field of Search .............. 29/623.1, 623.4; 429/161, 211

(56) References Cited

U.S. PATENT DOCUMENTS 3,650,842 A   3/1972   Bougaran
5,158,842 A   10/1992  McHenry

FOREIGN PATENT DOCUMENTS

| FR | 2088686 | | 1/1972 |
| JP | 57-32569 | | 2/1982 |
| JP | 60-131755 | * | 7/1985 |
| JP | 4-137356 | | 5/1992 |

* cited by examiner

Primary Examiner—Patrick Ryan
Assistant Examiner—Jonathan Crepeau
(74) Attorney, Agent, or Firm—Jordan and Hamburg LLP

(57) ABSTRACT

Positive electrode plates and negative electrode plates are arranged alternately with intervening separators, and their end faces are respectively butted on collector plates. A solder material made from nickel alloy is disposed on the surfaces of the collector plates, which are made from nickel. An electron beam is irradiated onto the collector plates for causing the solder material to melt, thereby bonding the end faces of the positive and negative electrode plates with the collector plates.

9 Claims, 6 Drawing Sheets

METHOD FOR BONDING COLLECTOR PLATES TO END FACES OF ELECTRODE PLATES

BACKGROUND OF THE INVENTION

1. Field of the Invention

The present invention relates to a method for manufacturing a battery, and more particularly, to a method for connecting the end faces of electrode plates with a collector plate.

2. Description of Related Art

For a rechargeable battery structure, a prismatic structure comprising layered positive electrode plates, negative electrode plates and separators has been used principally with aqueous solution-type rechargeable batteries. Such structure serves to increase the electrode surface area as much as possible within a restricted space, and in addition to raising the reactive efficiency of the electrode plates, thereby enabling a large current to be drawn. It therefore significantly affects battery characteristics.

In relation to rechargeable batteries having a structure comprising a layered plurality of electrode plates, various proposals have been made regarding mechanisms for extracting current from the respective electrode plates. One such proposal relates to a structure wherein lead-shaped conductors are attached to or derived from each individual electrode plate, gathered together, and then bonded to an electrode pole which extracts current to the exterior of the battery case.

However, in such structure as described above, the lead-shaped conductor sections occupy a large volume, and hence present a significant restriction when seeking to reduce the overall size of the battery.

Therefore, as illustrated in FIG. 8, a method has been devised wherein end faces of respective electrode plates 1a, 2a that are layered upon one another are welded directly to a collector plate 4. According to this method, electrode groups 1 and 2 constituted respectively by pluralities of positive electrodes 1a and negative electrodes 2a are respectively butted against and bonded to the surface of a collector plate 4, in a perpendicular attitude to same, a T-shaped joint being formed between each collector plate 4 and electrode group 1 or 2.

For this bonding operation, it is possible to apply an arc welding method as disclosed in Japanese Patent Publication No. 61-8539, an electron beam welding method as disclosed in Japanese Patent No. 2616197, or the like. However, if a welding method of this kind is used for bonding groups of electrode plates with collector plates in a battery as illustrated in FIG. 8, since the distance between the respective electrode plates 1a, 2a is set to an extremely small distance in order to reduce the size of the battery, heat will be transmitted to the separators 3 provided between the respective electrode plates 1a, 2a, causing same to melt and readily provoking shorting between the positive electrode plates 1a and negative electrode plates 2a, and hence it is difficult to join the aforementioned elements in a suitable manner.

SUMMARY OF THE INVENTION

The present invention was devised in view of the foregoing problems associated with the prior art, an object thereof being to provide a method for manufacturing a battery adopting a bonding joint structure between electrode plate groups and collector plates which enables the volumetric efficiency of the battery to be increased, wherein bonding is performed in a suitable and reliable manner.

The method for bonding collector plates to end faces of electrode plates according to the present invention comprises the steps of:

providing a solder material made from nickel alloy on a surface of a collector plate; and arranging a plurality of electrode plates perpendicular to the collector plate so that end faces of the electrode plates abut with the solder material on the collector plate;

irradiating an electron beam onto the collector plate from a direction opposite from the electrode plates for causing the solder material to melt, thereby bonding the end faces of the electrode plates with the collector plate.

By interposing a solder material having a lower melting point than the materials composing the electrode groups and collector plates in the joint between same, it is possible to join electrode plates to a collector plate by causing the solder material to melt by irradiating an electron beam onto the collector plate. The amount of heat applied to the joint can be reduced compared to a method where the respective elements are bonded directly by welding, and hence the electrode plates and collector plate can be bonded in a reliable manner, without imparting any thermal effects on regions other than the joint, such as the separators.

Desirably, the nickel alloy used for the aforementioned solder material is a binary alloy of nickel and phosphorous.

If the electron beam is irradiated onto a plurality of positions on the collector plate, then the collector plate and electrode plates can be bonded together more reliably, and it is also possible to maintain high collector efficiency. Furthermore, by ensuring that adjacent irradiation positions are not irradiated consecutively, in a portion of or all of the irradiation positions, a region irradiated by the electron beam will have cooled sufficiently before the electron beam is irradiated onto an irradiation position adjacent thereto, and hence thermal effects can be reduced in a more reliable manner.

The amount of irradiation of the electron beam is changed with respect to the lateral direction of the collector plate. Since dispersion of heat is particularly high at the ends of the collector plate, a uniform overall join state is obtained by increasing the amount of irradiation in the end regions. Specifically, for instance, the electron beam should be irradiated in a consecutive fashion in the lateral direction of the collector plate, whereupon the electron beam is irradiated further onto either end portion thereof.

If the electron beam is first irradiated onto a beam collector and the output thereof is stabilized, before it is irradiated onto the joint between an electrode plate and a: collector plate, then a highly reliable bonding can be accomplished.

Furthermore, by irradiating the electron beam onto the same position a plurality of times, it is possible to ensure sufficient input heat, even when using a compact and inexpensive electron beam irradiation device having a small per-operation irradiation energy.

Other and further objects, features and advantages of the invention will be apparent more fully from the following description.

DESCRIPTION OF THE PREFERRED EMBODIMENTS

Below, one embodiment of a method for bonding collector plates to the end faces of electrode plates according to the present invention is described with reference to FIG. 1 to FIG. 7.

Figure 1:
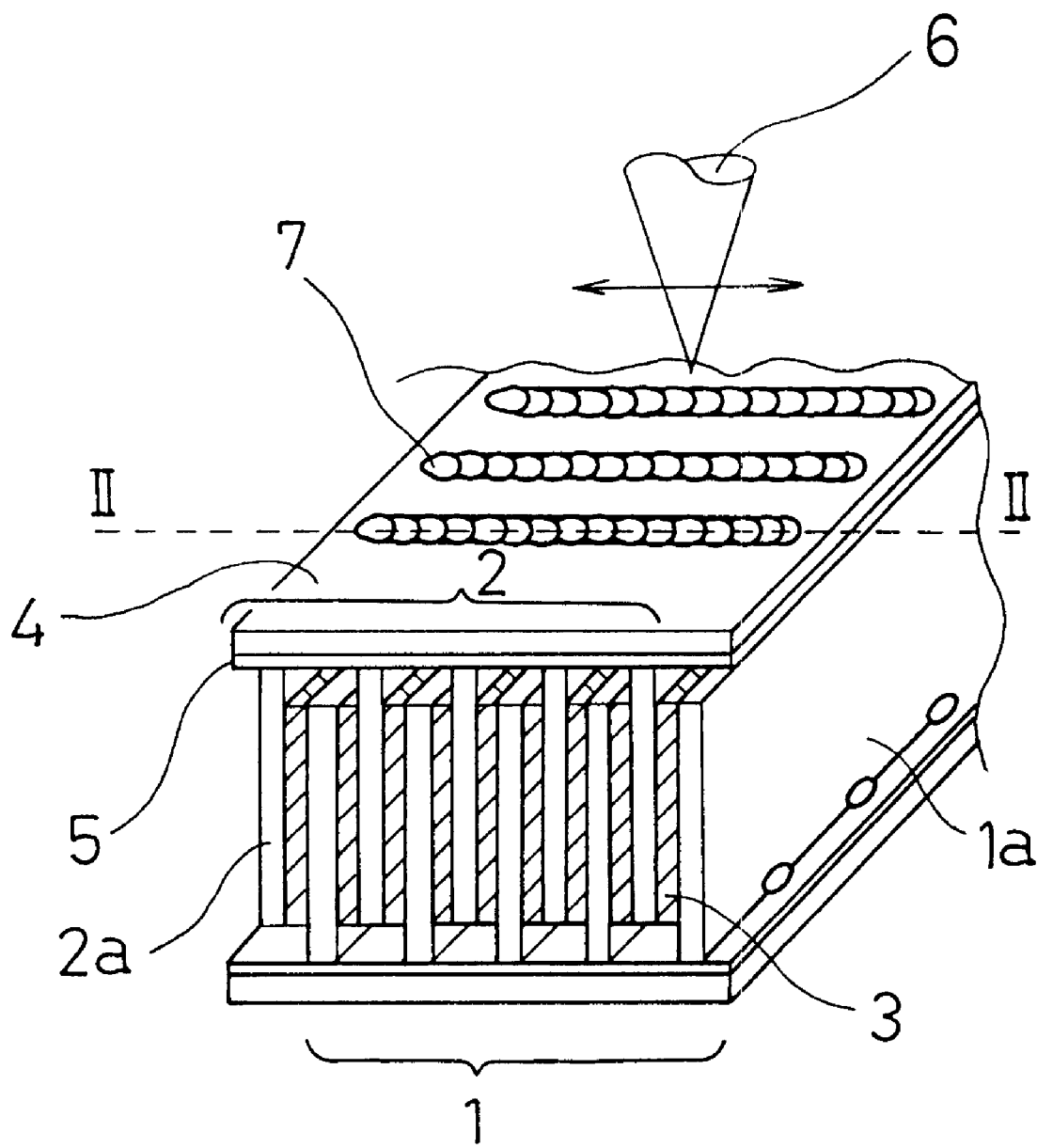
FIG. 1 is an oblique view showing a state of bonding electrode plates and a collector plate in one embodiment of the present invention.

In FIG. 1, electrode plate groups 1 and 2 constituted by a plurality of positive electrode plates 1a and negative electrode plates 2a are respectively butted against and fixed to the surface of a collector plate 4, in a perpendicular attitude with respect to same. A solder material 5 made from a raw material having a lower melting point than the electrodes plates and collector plates is interposed between the end faces of the pluralities of positive electrode plates 1a and negative electrode plates: 2a and the respective collector plates 4.

The respective collector plates 4 and electrode plate groups 1, 2 are bonded together by heating caused by irradiating an electron beam 6 onto the collector plate 4 from the opposite side to the electrode plate group 1, 2. The irradiation of the electron beam 6 is performed at a plurality of locations, whilst causing the electron beam to oscillate in a direction perpendicular to the longitudinal direction of the electrode plates, and welding beads 7 are formed on the surface of the collector plate 4 at the locations where the electron beam 6 was irradiated. In the example illustrated in FIG. 1, the electron beam 6 is irradiated in a line shape, but it is also possible to perform spot heating at each butting position between the collector plate and electrode plate.

Figure 2:
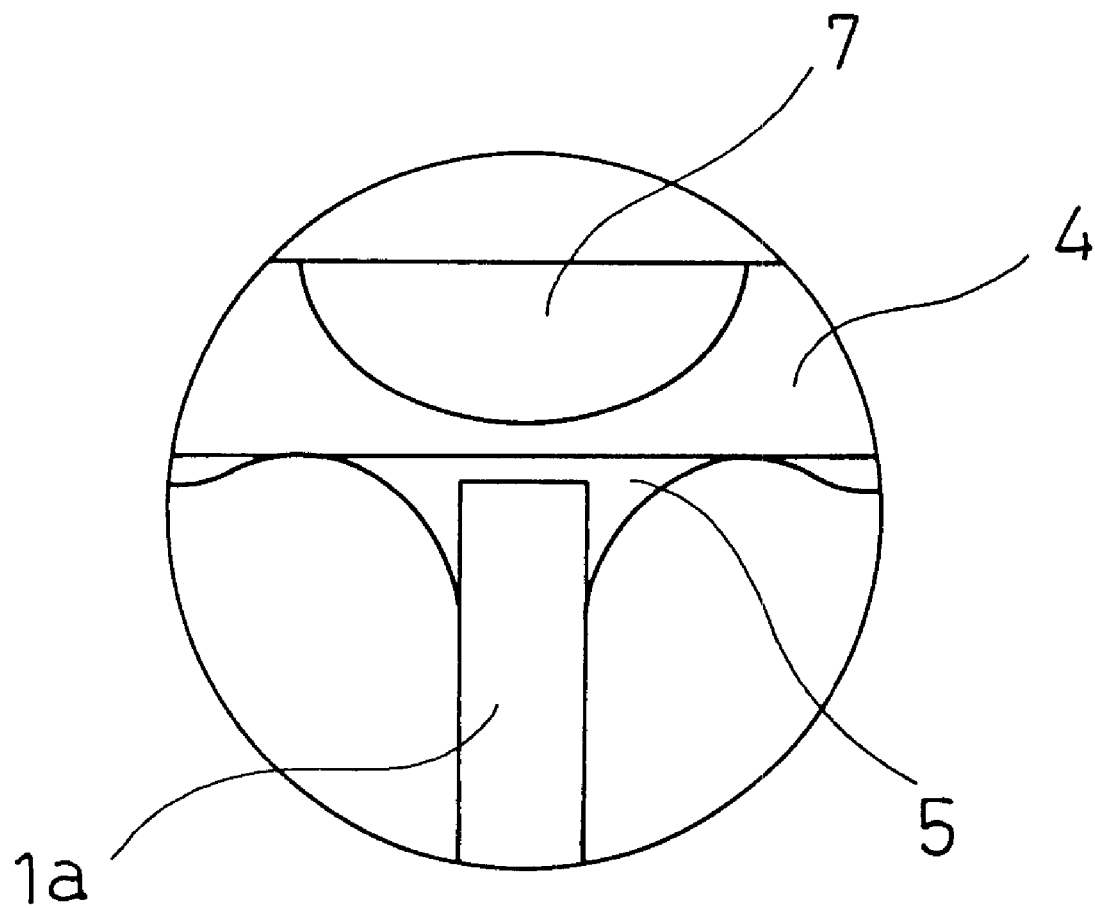
FIG. 2 is a partial enlarged sectional view along line II—II in FIG. 1.

FIG. 2 shows the cross-sectional structure of a bonded joint. The interior of the collector 4 melts partially due to irradiation of the electron beam 6, forming a molten bead 7, and the solder material 5 made from low-melting-point material is caused to melt due to the heat of the molten bead, thereby forming corner reinforcements. In this case, not only is the surface area of the bonded joint markedly larger than a simple T-shaped joint, but furthermore, the joint is formed using a smaller amount of heat input than a direct bonding method based on welding. Therefore, there is no risk of damaging the other members due to penetration of the electron beam 6, and the stability of the joint can be improved.

The low-melting-point material constituting the solder material 5 in the present embodiment is required to be durable with respect to the alkaline aqueous solution used as the battery electrolyte, in particular. In the case of a nickel-cadmium rechargeable battery or nickel metal hydride battery which uses KOH as an electrolyte, and wherein nickel is used for the collector plates, a nickel alloy is suitable. In particular, a binary alloy of nickel principally containing several % to several 10% of phosphorous has a melting point of 900° C., and can be used as a low-melting-point material without reacting with the electrolyte. Furthermore, an alloy made from four elements, for example, NiCr-B-Si, has a melting point of 950° C. Since this is lower than the melting point of nickel used in the surfaces of the collector 4 and electrodes 1a, 2a, and since only a small input heat is required from the electron beam 6, such quaternary alloys can also suitably be used for the low-melting-point material.

Figure 3A:
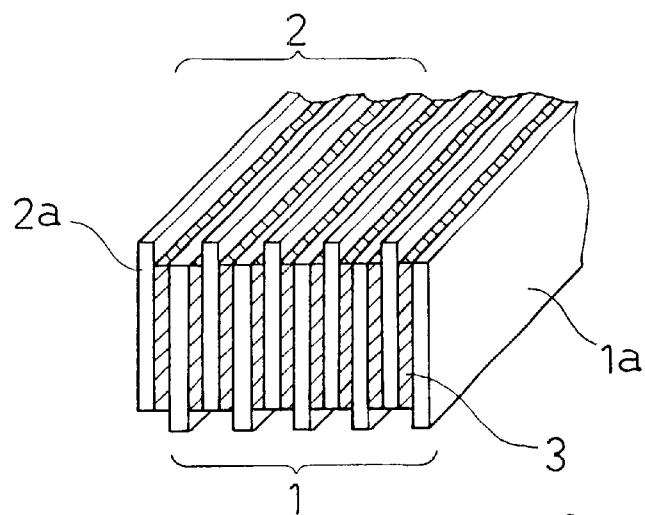
FIG. 3A–FIG. 3C are oblique views illustrating steps for bonding electrode plates and collector plates according to the aforementioned embodiment.
Figure 3B:
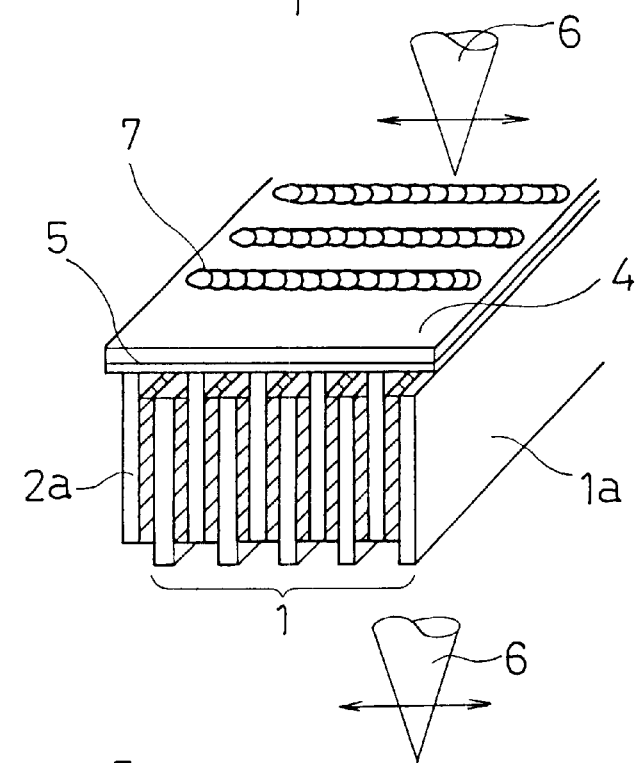
Figure 3C:
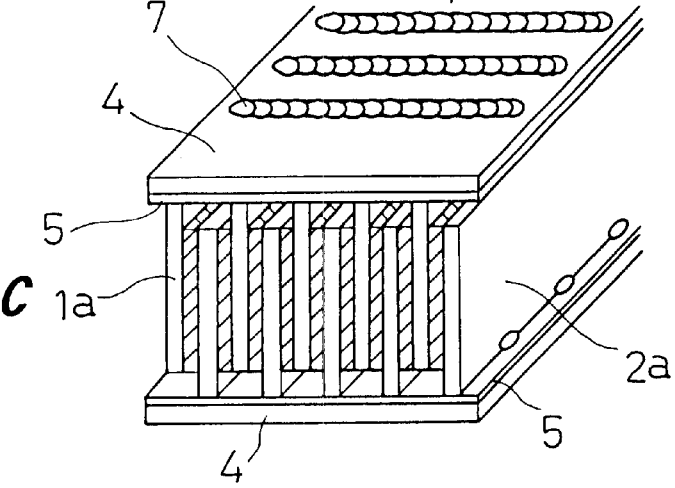

Next, steps for manufacturing a battery are described with reference to FIG. 3A to FIG. 3C. Firstly, as shown in FIG. 3A, positive and negative electrode plate groups 1, 2 are formed by layering positive electrode plates 1a and negative electrode plates 2a alternately whilst interposing separators 3 therebetween. Here, the electrode plates are disposed in such a fashion that the electrode plates of one polarity protrude on one side and the electrode plates of the other polarity protrude on the other side. Thereupon, as shown in FIG. 3B, a collector 4 having a low-melting-point solder material 5 disposed on one side thereof is butted against either one of the groups of electrode plates in such a manner that the face bearing the solder material 5 tightly contacts the end faces of said electrode plates. Pressure is then applied on the collector plate 4 from above in order to ensure tight contact between the end faces of the electrode plate group 1 or 2 and the solder material 5 on the collector plate 4, whereupon an electron beam 6 is irradiated onto the collector plate 4 from above.

In the present embodiment, the electron beam 6 is irradiated from a perpendicular direction to the end faces of the electrode plates, in such a fashion that a plurality of lines of molten beads 7 are formed in the direction in which the electrode plates are aligned. Thereby, a plurality of joint points are formed between the respective electrode plates 1a or 2a and the collector plate 4. Thereupon, as shown in FIG. 3C, the vertical orientation of the electrode groups is inverted, and the electrode plates 2a or 1a of the other polarity are bonded to a collector plate 4 in a similar manner to the foregoing. By means of the aforementioned processes, the bonding of the electrode groups 1, 2 and the collector plate 4 is completed.

Figure 4:
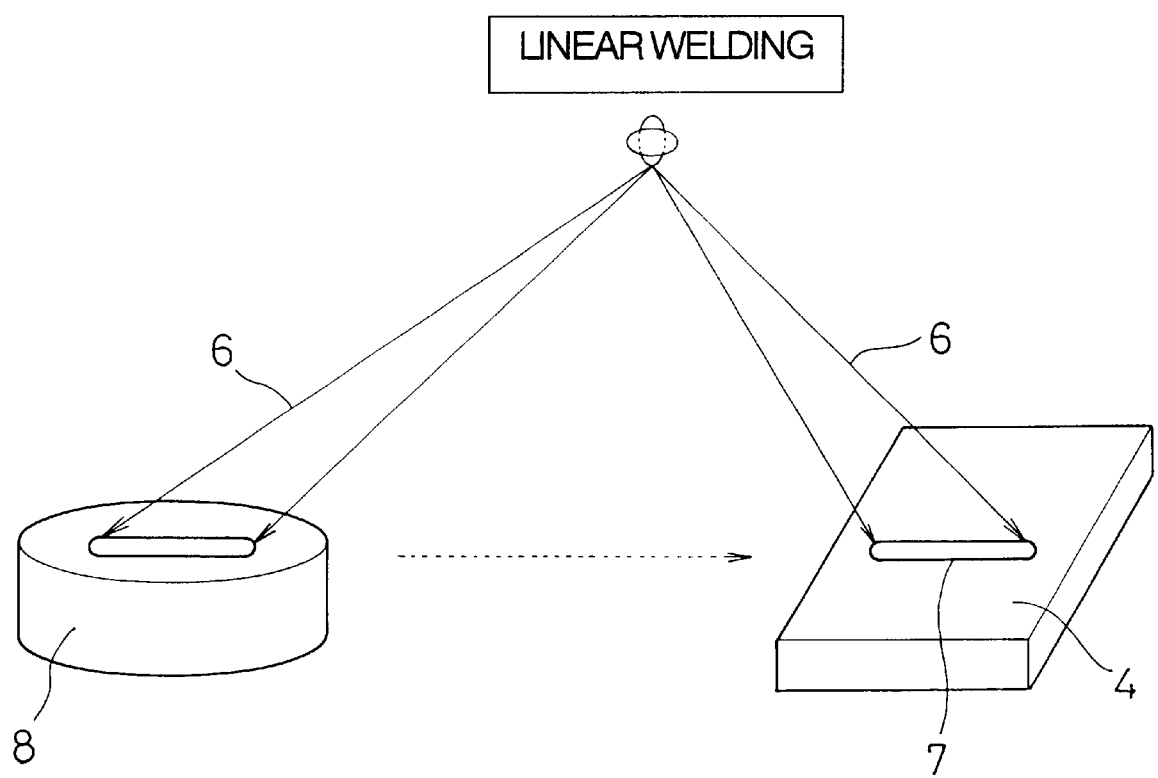
FIG. 4 is an illustrative view of a method for irradiating an electron beam according to the aforementioned embodiment.
Figure 5:
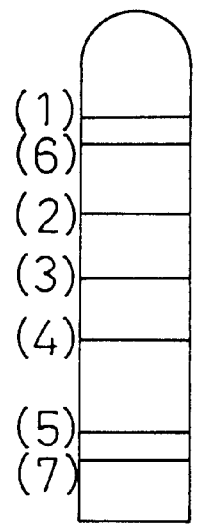
FIG. 5 is an illustrative view of the distribution of bonding joints and a bonding sequence according to the aforementioned embodiment.

As illustrated in FIG. 4, when bonding a collector plate 4 and an electrode plate group 1 or 2 by irradiation of an electron beam 6 as described above, firstly, the electron beam 6 is irradiated onto a beam collector 8 in order to stabilize the electron beam 6, whereupon the electron beam 6 proceeds to the collector plate 4, which is the work to be welded, causing same to melt. The movement of the electron beam 6 from the beam collector 8 to the electron beam 4 takes place in approximately 0.1 msec. By first stabilizing the electron beam before irradiating it onto the collector plate 4 in this way, it is possible to join a collector plate 4 and an electrode group 1 or 2 by means of an electron beam 6 which is always stable.

The electron beam 6 is irradiated onto the collector plate 4 for approximately 100 msec at each row position. In this operation, since the electron beam 6 functions at a frequency of 5 kHz, each row is irradiated 500 times consecutively. Thereby, as well as being able to perform bonding by means of an electron beam 6 from a compact and inexpensive electron beam irradiation device of relatively low output, by performing irradiation a plurality of times, it is also possible to irradiate the electron beam 6 in an: even manner, thereby imparting uniform heat energy, and consequently, the solder material 5 melts in a uniform manner.

When forming molten beads 7 on the collector plate 4 in a plurality of parallel rows spaced at intervals, after irradiating the electron beam for approximately 100 msec in the first row, the second row is determined by moving the electron beam for 0.1 msec, and this second row is irradiated. The next row is set similarly at the location reached by moving the electron beam for 0.1 msec, this operation being repeated thereafter to form a plurality of rows of molten beads 7.

In the case where the interval between adjacent irradiation rows is extremely narrow, the electron beam 6 may be irradiated in an irregular sequence at separated non-consecutive locations, so as to prevent the heat generated from affecting other constituent components due to the electron beam 6 being irradiated for a long period of time within a small area of the collector plate 4. For example, in the example shown in FIG. 5, after irradiating the first row, the second row, which is separated by a small interval, is skipped, and the third row is irradiated in the second operation, whereupon the fourth to sixth rows, which have sufficient intervals therebetween, are irradiated consecutively in the third to fifth operations, and then the sixth irradiation operation returns to the second row, whilst in the last and seventh operation, the seventh row, which is separated from the sixth row by a narrow interval, is irradiated.

Figure 6:
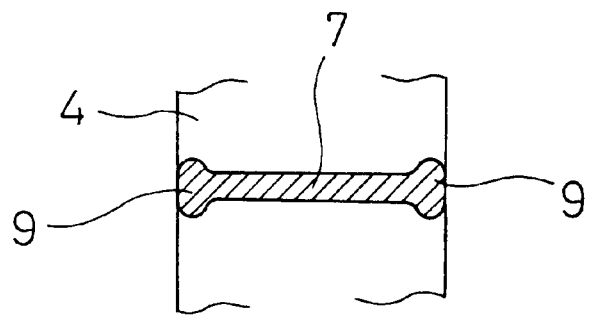
FIG. 6 is an illustrative view showing the state of a bonded joint according to the aforementioned embodiment.
Figure 7:
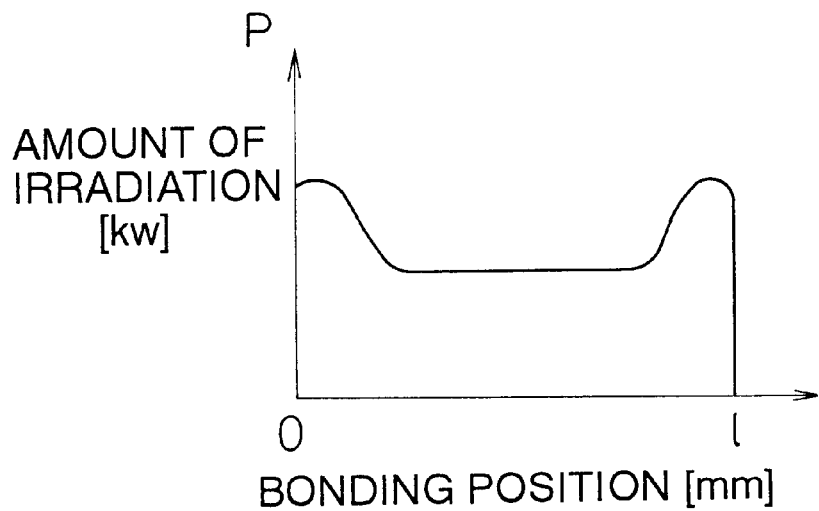
FIG. 7 is a graph depicting the relationship between the bonding position and the output of the electron beam according to the aforementioned embodiment.
Figure 8:
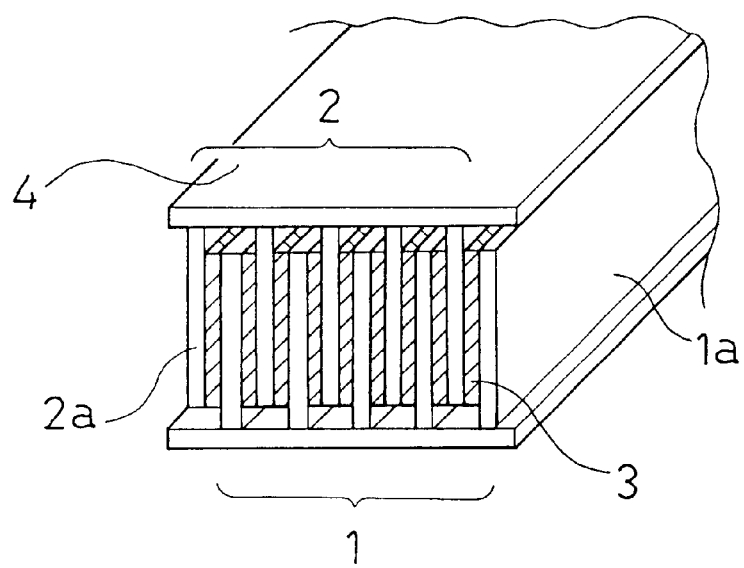
FIG. 8 is an oblique view illustrating a state of bonding an electrode group and a collector plate according to a prior art example.

Furthermore, when the electron beam 6 is irradiated, the output thereof is changed with respect to the lateral direction of irradiation, as illustrated in FIG. 6 and FIG. 7. This is because, heat radiation properties are higher at the end portions of the bonded joint than in the central portion thereof, and the solder material 5 may become concentrated, and hence there is a risk that reliable bonding will not be achieved unless the amount of input heat is increased. Therefore, as shown in FIG. 7, the amount of input heat from irradiation is set higher at either end portion compared to the central portion. More specifically, as shown in FIG. 6, after forming molten beads 7 between the two end portions by irradiating the electron beam 6 consecutively for a plurality of times from one end, via the central portion, to the other end, spot beam marks 9 having a high irradiation heat input are formed at the respective; end portions only, by further irradiation for a plurality of times.

According to the present embodiment, as described above, since a solder material 5 having a lower melting point than the materials constituting the electrode groups 1, 2 and the collector plates 4 is interposed at the joint between the electrode groups 1, 2 and collector plates 4, this solder material 5 being caused to melt by irradiating an electron beam 6 onto same, thereby bonding the electrode plates 1a, 2a with the collector plate 4, it is possible to perform reliable bonding whilst restricting the amount of heat supplied to the joints, and hence the electrode plates 1a, 2a and collectors 4 can be bonded in a reliable fashion, without thermal effects extending to regions other than the joints, such as the separators 3, and others.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method for manufacturing a battery comprising the steps of:

providing a solder material made from nickel alloy on a surface of a collector plate;

arranging a plurality of electrode plates perpendicular to the collector plate so that end faces of the electrode plates abut with the solder material on the collector plate; and irradiating an electron beam onto the collector plate from a direction opposite from the electrode plates for causing the solder material to melt, thereby bonding the end faces of the electrode plates with the collector plate.

2. The method of manufacturing a battery according to claim 1, wherein the nickel alloy is a binary alloy of nickel and phosphorous.

3. The method of manufacturing a battery according to claim 1, wherein the nickel alloy is a quaternary alloy of nickel, chromium, boron, and silicon.

4. The method of manufacturing a battery according to claim 1, wherein the electron beam is irradiated onto a plurality of positions on the collector plate, and a plurality of positions on the collector plate that are not adjacent each other are irradiated consecutively.

5. The method of manufacturing a battery according to claim 1, wherein the amount of irradiation of the electron beam is changed with respect to the lateral direction of the collector plate.

6. The method of manufacturing a battery according to claim 5, wherein the electron beam is irradiated in a consecutive fashion in the lateral direction of the collector plate, whereupon the electron beam is irradiated further onto either end portion thereof.

7. The method of manufacturing a battery according to claim 1, further comprising the step of irradiating the electron beam onto a beam collector until the electron beam is stabilized, prior to the step of irradiating the electron beam onto the collector plate.

8. The method of manufacturing a battery according to claim 7, wherein the electron beam is irradiated onto a plurality of positions on the collector plate, and each time the electron beam is irradiated on the collector plate, the electron beam is first irradiated onto the beam collector before it is irradiated onto the collector plate.

9. The method of manufacturing a battery according to claim 1, wherein the electron beam is irradiated onto an identical position a plurality of times.

\* \* \* \* \*